United States Patent
Choi et al.

(10) Patent No.: US 12,493,411 B2
(45) Date of Patent: Dec. 9, 2025

(54) STORAGE DEVICE FOR REDUCING DELAY OF PARITY OPERATION, CONTROLLER AND METHOD FOR OPERATING CONTROLLER

(71) Applicant: SK hynix Inc., Icheon-si (KR)

(72) Inventors: Hyo Jin Choi, Icheon-si (KR); Kwan Su Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 121 days.

(21) Appl. No.: 18/309,796

(22) Filed: Apr. 29, 2023

(65) Prior Publication Data

US 2024/0176493 A1    May 30, 2024

(30) Foreign Application Priority Data

Nov. 30, 2022   (KR) .......................... 10-2022-0164072

(51) Int. Cl.
 *G06F 3/06* (2006.01)

(52) U.S. Cl.
 CPC .......... *G06F 3/0613* (2013.01); *G06F 3/0656* (2013.01); *G06F 3/0659* (2013.01); *G06F 3/0679* (2013.01)

(58) Field of Classification Search
 USPC ........................................................ 711/103
 See application file for complete search history.

(56) References Cited

U.S. PATENT DOCUMENTS

| | | | |
|---|---|---|---|
| 11,138,071 B1 * | 10/2021 | Agarwal | G06F 3/061 |
| 11,599,268 B2 * | 3/2023 | Kim | G06F 11/1068 |
| 2018/0285074 A1 * | 10/2018 | Shergill | G06F 5/14 |
| 2022/0236915 A1 * | 7/2022 | Kang | G06F 12/0246 |

FOREIGN PATENT DOCUMENTS

| KR | 10-2020-0141172 A | 12/2020 |
|---|---|---|
| KR | 10-2021-0057202 A | 5/2021 |

* cited by examiner

*Primary Examiner* — Mark A Giardino, Jr.

(57) ABSTRACT

A first processor manages state information of a buffer area of a buffer memory used as a parity area in a parity operation mode and outputs a control signal according to the state information, and a second processor which performs a parity operation using the buffer area performs the parity operation according to the control signal of the first processor.

20 Claims, 7 Drawing Sheets

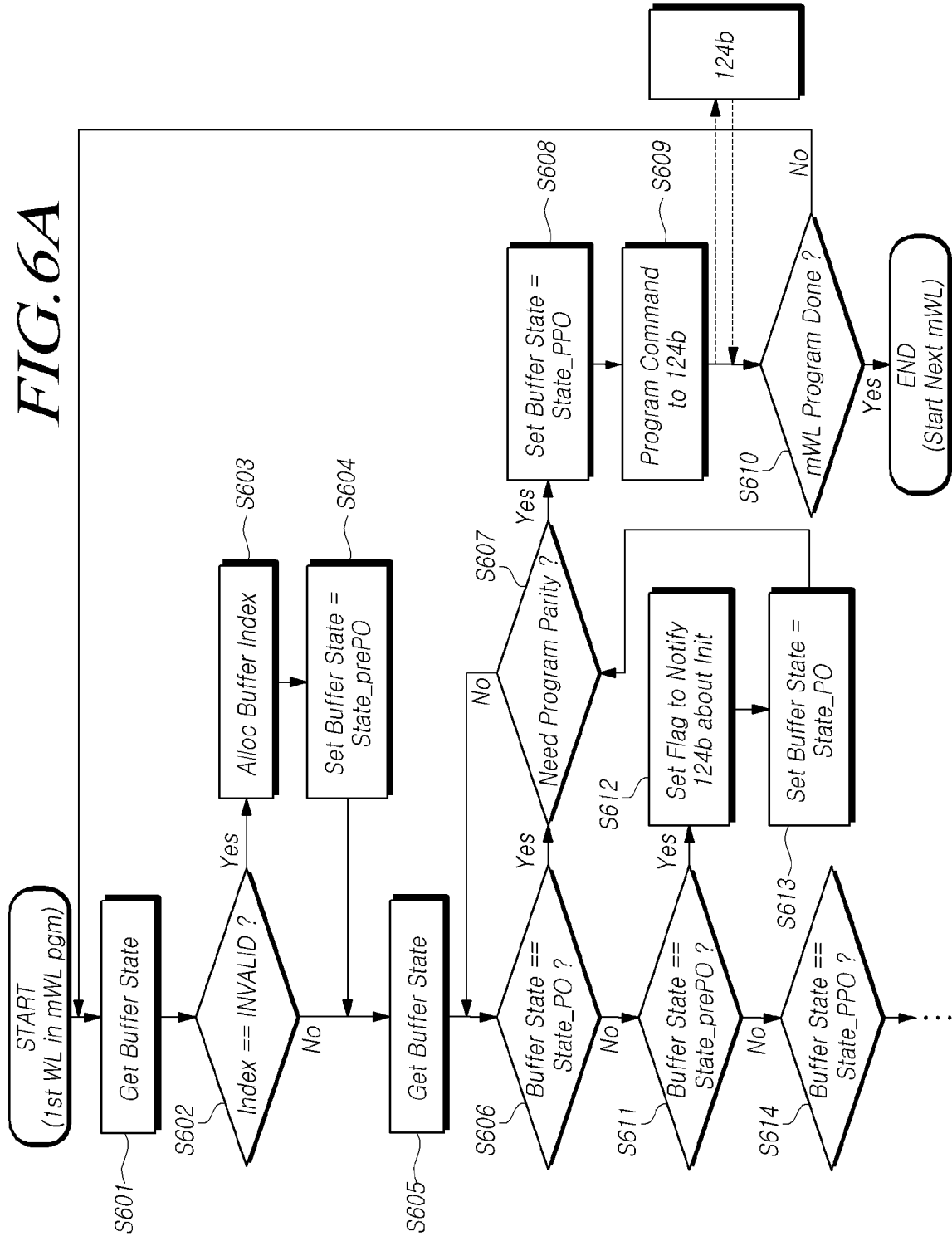

STORAGE DEVICE FOR REDUCING DELAY OF PARITY OPERATION, CONTROLLER AND METHOD FOR OPERATING CONTROLLER

CROSS-REFERENCE TO RELATED APPLICATION

The present application claims priority under 35 U.S.C. § 119(a) to Korean Patent Application No. 10-2022-0164072 filed in the Korean Intellectual Property Office on Nov. 30, 2022, which is incorporated herein by reference in its entirety.

BACKGROUND

1. Technical Field

Various embodiments generally relate to a storage device for reducing delay of a parity operation, a controller and a method for operating a controller.

2. Related Art

A storage device may include, for example, a memory that includes a plurality of memory cells and a controller that controls the memory. The controller may perform an operation of writing data to the memory, deleting data from the memory or reading data stored in the memory, according to a command inputted from the outside.

When performing an operation of writing data to the memory, the controller may perform an operation of generating and storing a parity value, which may be used to recover an error of data stored in the memory.

Since a time delay may occur in the process by which the controller generates a parity value and stores the parity value in the memory, a method capable of efficiently performing generation and storage of a parity value is required.

SUMMARY

Various embodiments are directed to providing measures capable of efficiently performing a process in which a parity value for data to be written to a memory is generated and stored.

In an embodiment, a storage device may include: a main memory including a plurality of memory areas; and a controller configured to control the main memory, the controller including: a buffer memory; a first processor configured to, in a parity operation mode in which a parity value for data to be written to the main memory generated, manage state information of at least one of a plurality of buffer areas included in the buffer memory, and to output a control is signal according to the state information; and a second processor configured to operate according to the control signal of the first processor, and to write the parity value to the buffer memory.

In an embodiment, a controller may include: a buffer memory; a first processor configured to, in a parity operation mode in which a parity value for data to be written to a memory located outside is generated, manage state information of at least one of a plurality of buffer areas included in the buffer memory, and to output a control signal according to the state information; and a second processor configured to operate according to the control signal of the first processor, and to write the parity value to the buffer memory.

In an embodiment, a method for operating a controller may include: allocating at least one among a plurality of buffer areas included in a buffer memory, as a parity area; generating a parity value for data to be written to a predesignated memory area of a memory located outside, and writing the parity value to the parity area; writing, when writing of the parity value for the data to be written to the predesignated memory area is completed, the parity value to the memory located outside; and initializing the parity area to which the parity value is written.

According to the embodiments of the disclosed technology, efficiency of a parity operation may be improved by reducing a time delay in a process in which a parity value for data to be written to a memory is generated and stored.

BRIEF DESCRIPTION OF THE DRAWINGS

FIGS. 6A and 6B are flowcharts illustrating an example of a parity operation performed in a storage device according to an embodiment of the disclosure.

DETAILED DESCRIPTION

Figure 1:
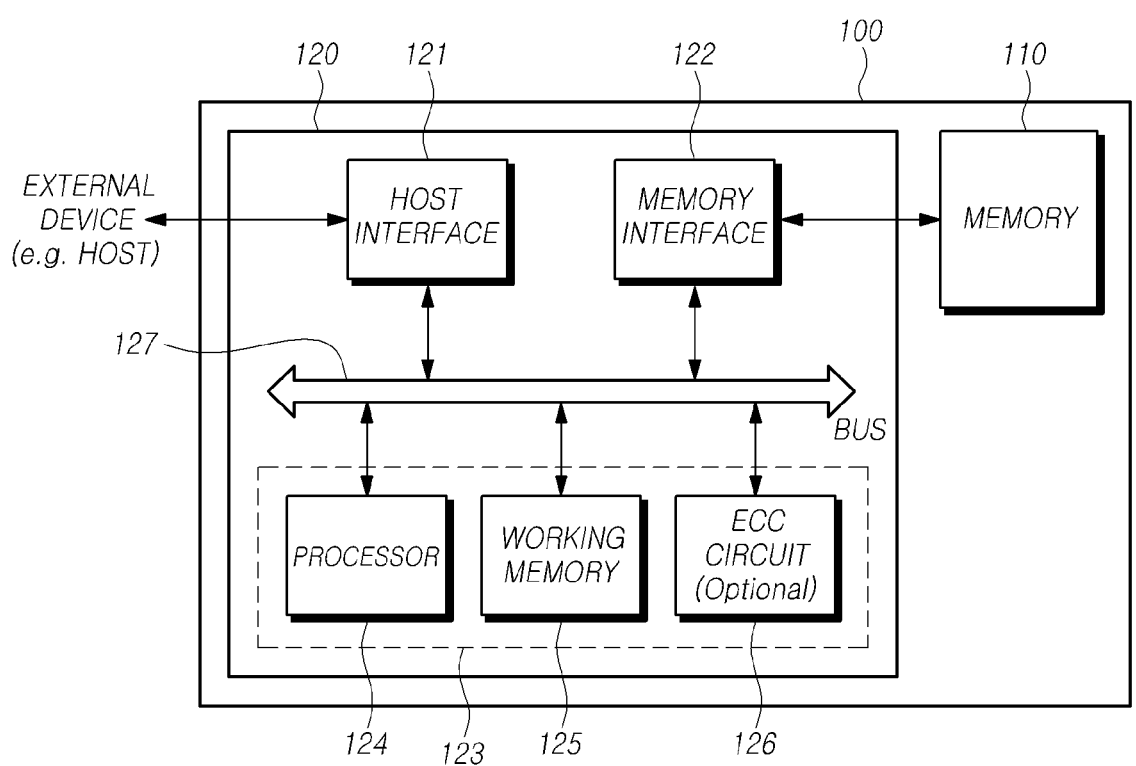
FIG. 1 is a schematic configuration diagram of a storage device according to an embodiment of the disclosure.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure unclear. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g., "a," "an" and "the," this may include a plural of that noun unless specifically stated otherwise.

Also, in describing the components of the disclosure, there may be terms used like first, second, A, B, (a), and (b). These are solely for the purpose of differentiating one component from another component but do not limit the substances, order, sequence or number of the components.

In descriptions for the positional relationships of components, where it is described that at least two components are "connected," "coupled" or "linked," it is to be understood that the at least two components may be directly "connected," "coupled" or "linked" but may be indirectly "connected," "coupled" or "linked" with another component interposed between the two components. Here, another component may be included in at least one of the at least two components which are "connected," "coupled" or "linked" with each other.

In descriptions for time flow relationships of components, an operating method or a fabricating method, where pre and post relationships in terms of time or pre and post relationships in terms of flow are described, for example, by "after," "following," "next" or "before," non-continuous cases may be included unless "immediately" or "directly" is used.

When a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

Hereinafter, various embodiments of the present disclosure will be described in detail with reference to the accompanying drawings.

FIG. 1 is a schematic configuration diagram of a storage device according to an embodiment of the disclosure. Referring to FIG. 1, a storage device 100 may include a memory 110 that stores data, and a controller 120 that controls the memory 110.

The memory 110 may include a plurality of memory blocks, and may operate in response to the control of the controller 120. Operations of the memory 110 may include, for example, a read operation, a program operation (also referred to as a write operation) and an erase operation.

The memory 110 may include a memory cell array including a plurality of memory cells (simply referred to as "cells"), which store data. Such a memory cell array may exist in a memory block.

For example, the memory 110 may be implemented into various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 110 may be implemented into a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area that is selected by the address in the memory cell array. The memory 110 may perform an operation instructed by the command, on the area selected by the address.

The memory 110 may perform a program operation, a read operation or an erase operation.

When performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear-leveling (WL) operation, a read reclaim (RR) operation, a bad block management (BBM) operation, and so forth.

The controller 120 may control the operation of the memory 110 according to a request from a device (e.g., a host) located outside the storage device 100. Also, the controller 120 may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc.

The host may include at least one operating system. The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be implemented by being integrated into one device. Hereafter, for the sake of convenience in explanation, embodiments will be described with the controller 120 and the host separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one among various interface protocols such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics) protocol, an SMBus (System Management Bus) protocol, an I2C (Inter-Integrated Circuit) protocol, an I3C (Improved Inter-Integrated Circuit) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. The memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may selectively include an error detection and correction circuit (ECC circuit) 126.

The processor 124 may control the general operation of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate it into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. In order to control the general operation of the controller 120 and perform a logic calculation, the processor 124 may execute (drive) firmware loaded in the working memory 125 upon booting. Hereafter, embodiments of an operation of the storage device 100 will be described as implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL) which serves to analyze a command requested to the storage device 100 from the host and transfer the command to the flash translation layer (FTL); and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 to generate a command or a signal, according to a result of performing the logic calculation defined in the firmware. When a part of firmware, in which a logic calculation to be performed is defined, is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data that are necessary to drive the controller 120. A working memory 125 may be, for example, a volatile memory that includes at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using the error correction code. The error detection and correction circuit 126 may be implemented by various code decoders. For example, a decoder that performs unsystematic code decoding or a decoder that performs systematic code decoding may be used.

For example, the error detection and correction circuit 126 may detect an error bit by the unit of a set sector in each of read data. Each read data may be constituted by a plurality of sectors. A sector may mean a data unit that is smaller than a page, as a read unit of a flash memory. Sectors constituting each read data may be matched with one another using an address.

The error detection and correction circuit 126 may calculate a bit error rate (BER), and may determine whether an error is correctable or not by the unit of a sector. For example, when a bit error rate is higher than a set reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector for next read data. When the error detection and correction operation for all read data is ended in this way, the error detection and correction circuit 126 may detect a sector which is determined to be uncorrectable. There may be one or more sectors that are determined to be uncorrectable. The error detection and correction circuit 126 may transfer information (e.g., address information) on a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

Figure 2:
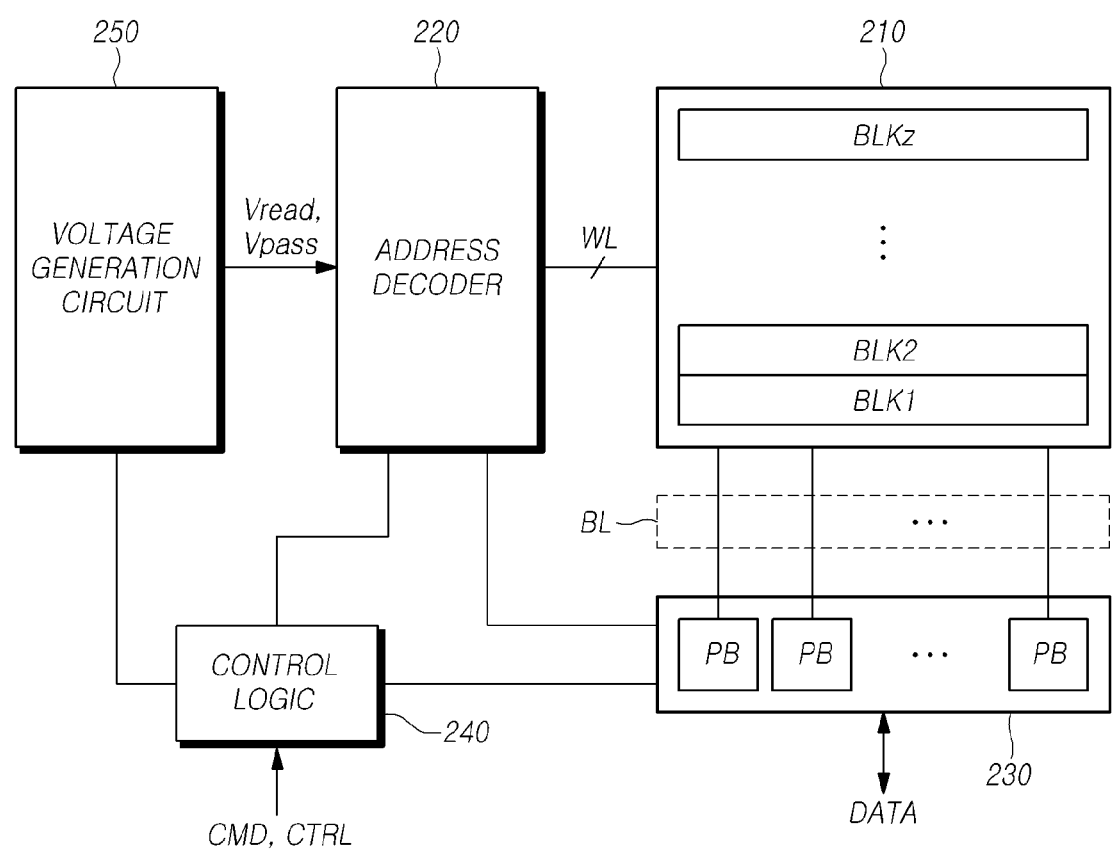
FIG. 2 is a schematic configuration diagram of a memory included in a storage device according to an embodiment of the disclosure.

FIG. 2 is a schematic configuration diagram of a memory included in a storage device based on the embodiment of the disclosed technology.

Referring to FIG. 2, a memory 110 may include a memory cell array 210, an address decoder 220, a read and write circuit 230, a control logic 240 and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells (MC). For example, the plurality of memory cells (MC) may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells (MC) included in the memory cell array 210 may store data of at least 1 bit. For instance, each of the plurality of memory cells (MC) included in the memory cell array 210 may be a single level cell (SLC) that stores 1-bit data. In another instance, each of the plurality of memory cells (MC) included in the memory cell array 210 may be a multi-level cell (MLC) that stores 2-bit data, a triple level cell (TLC) that stores 3-bit data or a quad level cell (QLC) that stores 4-bit data.

The number of bits of data stored in each of the plurality of memory cells (MC) may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL. The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block according to the decoded block address.

The address decoder 220 may receive a read voltage Vread and a pass voltage Vpass from the voltage generation circuit 250.

In a read voltage applying operation, during a read operation the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line WL depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 may also be referred to as a page buffer circuit that includes a plurality of page buffers PB or a data register circuit. The read and write circuit 230 may include data buffers that take charge of a data processing function, and may further include cache buffers which take charge of a caching function.

The plurality of page buffers PB may be coupled to the memory cell array 210 through the plurality of bit lines BL. In a read operation and a program verify operation, the plurality of page buffers PB may continuously supply sensing current to bit lines BL coupled with memory cells to sense threshold voltages (Vth) of the memory cells, and may latch sensing data by sensing, through sensing nodes, changes in amounts of current flowing according to the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric, and a control gate to which a gate voltage is applied from a word line WL.

A read operation and a program operation (write operation) of the memory block described above may be performed by the unit of a page, and an erase operation may be performed by the unit of a memory block.

The controller 120 may perform a parity operation of generating and storing a parity value for data to be programmed to a memory block when a program operation is performed on the memory block. A state in which such a parity operation is performed may be referred to as a parity operation mode.

Figure 3:
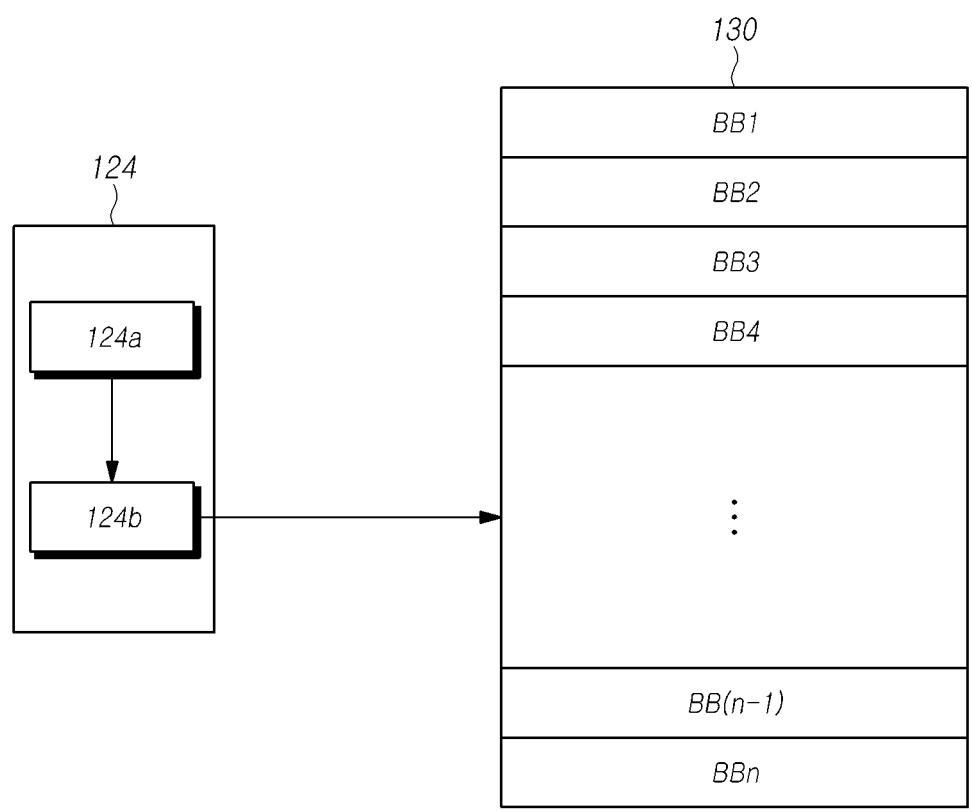
FIG. 3 is a diagram illustrating an example of a processor that performs a parity operation and a buffer memory that is used when performing the parity operation, in a storage device according to an embodiment of the disclosure.

FIG. 3 is a diagram illustrating an example of a processor that performs a parity operation and a buffer memory that is used when performing the parity operation, in a storage device according to an embodiment of the disclosure.

Referring to FIG. 3, a processor 124 and a buffer memory 130 included in a storage device 100 are illustrated as an example.

The processor 124 may be included in the controller 120, and may include, for example, a first processor 124a and a second processor 124b.

The buffer memory 130 may be located inside the controller 120, or the buffer memory 130 may be located outside the controller 120.

When the buffer memory 130 is located inside the controller 120, the buffer memory 130 may be located in the first processor 124a. In some embodiments, the buffer memory 130 may be located outside the first processor 124a.

The buffer memory 130 may be an aforementioned working memory 125, or may be a memory that is disposed separately from the working memory 125.

Alternatively, the buffer memory 130 may be an area allocated in the working memory 125, which is included in the controller 120 to perform a parity operation.

The first processor 124a may control the operation of the second processor 124b on the basis of a command inputted from the outside. The first processor 124a may operate by receiving a command through a separate component, which is disposed inside the processor 124 and directly receives a command from the outside.

The first processor 124a may control a parity operation by the second processor 124b. While the parity operation is performed by the second processor 124b, the first processor 124a may manage state information of the buffer memory 130 used for the parity operation.

The first processor 124a may output a control signal based on the state information of the buffer memory 130. The first processor 124a may transmit the control signal to the second processor 124b.

The second processor 124b may perform a parity operation on the basis of the control signal received from the first processor 124a.

The second processor 124b may perform the parity operation, for example, by using at least a part of a plurality of buffer areas BB1, BB2, BB3, BB4, . . . , BB(n−1) and BBn included in the buffer memory 130 according to the control signal.

For example, while an operation in which data is written to the memory 110 is performed, the second processor 124b may generate a parity value based on the data, and may write the generated parity value to a buffer area BB of the buffer memory 130.

The second processor 124b may generate a parity value, for example, by performing an XOR operation on data to be written to the memory 110. The second processor 124b may write the parity value generated by performing the XOR operation to an area allocated as a parity area in the buffer area BB of the buffer memory 130. The parity value may be a value that is used when correcting an error of data written to the memory 110.

The second processor 124b may write the parity value written to the buffer area BB of the buffer memory 130 to the memory 110 at a preset time point. A parity value may be generated for each preset memory area among a plurality of memory areas included in the memory 110. For example, a parity value may be generated by the unit of an m number of word lines WL and a p number of strings.

The second processor 124b may perform a parity operation and write a generated parity value to the buffer area BB of the buffer memory 130 before a write operation for writing data to a preset memory area is ended. When the write operation for writing the data to the preset memory area is ended, the second processor 124b may perform an operation of writing the parity value written to the buffer area BB of the buffer memory 130 to a predesignated area of the memory 110.

The parity value according to the parity operation performed by the second processor 124b may be stored in the memory 110, and when an error occurs in the data written to the memory 110, correction of the error on the basis of the parity value may be performed.

While the parity operation by the second processor 124b is performed, the first processor 124a may manage state information of the plurality of buffer areas BB included in the buffer memory 130 for efficient use of the buffer memory 130, and may output a control signal based on the state information.

As the state information of each buffer area BB of the buffer memory 130 is managed by the first processor 124a, efficiency of the parity operation by the second processor 124b may be improved.

The state information of each buffer area BB of the buffer memory 130 managed by the first processor 124a may be managed, for example, as follows.

Figure 4:
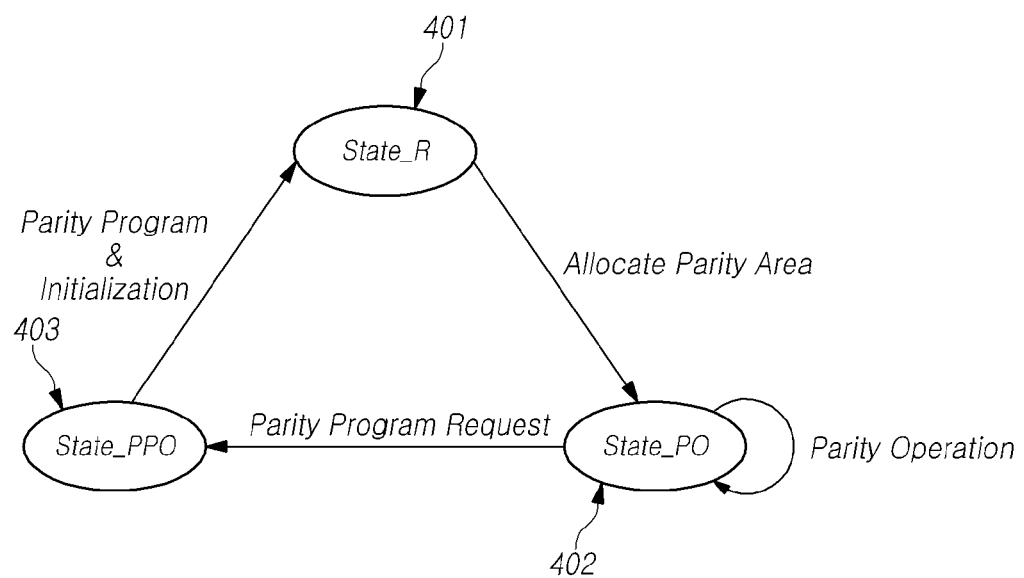
FIG. 4 is a diagram illustrating an example of states of a buffer memory, which is managed when a parity operation is performed in a storage device according to an embodiment of the disclosure.

FIG. 4 is a diagram illustrating an example of states of a buffer memory, which is managed when a parity operation is performed in a storage device according to an embodiment of the disclosure.

Referring to FIG. 4, in a parity operation mode, a state information of a buffer area BB included in the buffer memory 130 may be, for example, one of a release state State_R indicated by the reference numeral 401, a parity operation state State_PO indicated by the reference numeral 402 and a parity program state State_PPO indicated by the reference numeral 403.

The release state State_R may mean a state in which the buffer area BB of the buffer memory 130 is not used in a parity operation. The buffer area BB in the release state State_R may be allocated as a parity area when a parity operation by a second processor 124b is started.

When the buffer area BB in the release state State_R is allocated as a parity area by a first processor 124a, the second processor 124b may perform a parity operation of generating and storing a parity value obtained by performing an XOR operation on data to be stored in a memory 110, by using the buffer area BB allocated as a parity area.

When the buffer area BB in the release state State_R is allocated as a parity area, the first processor 124a may set state information of the corresponding buffer area BB to the parity operation state State_PO.

The second processor 124b may perform the parity operation using the buffer area BB, which is set to the parity operation state State_PO. When the parity operation on a preset area (e.g., an m number of word lines WL and a p number of strings) is completed, the second processor 124b may transmit a parity program request signal to the first processor 124a.

The parity program request signal may be a signal notifying that a parity operation on a preset area is completed. For example, the second processor 124b may set a flag indicating completion of a parity operation and transmit the flag to the first processor 124a.

When receiving the parity program request signal, the first processor 124a may set state information of the buffer area BB which is set to the parity operation state State_PO to the parity program state State_PPO. In the parity program state State_PPO, the parity value written to the buffer area BB allocated as a parity area may be written to a predesignated area of the memory 110. When receiving the parity program request signal, the first processor 124a may transmit a parity program command signal to the second processor 124b. After transmitting the parity program command signal to the second processor 124b, the first processor 124a may set state information of the buffer area BB used in the parity operation to the release state State_R.

When receiving the parity program command signal, the second processor 124b may perform an operation of writing the parity value written to the buffer area BB allocated as a parity area to a predesignated area of the memory 110.

When the operation of writing the parity value to the memory 110 is completed, the second processor 124b may initialize the buffer area BB in which the parity value is stored. Since the second processor 124b initializes the buffer area BB used as a parity area upon completing the parity program operation, an advantage is provided in that an initialization operation does not need to be performed when the corresponding buffer area BB is used thereafter for another parity operation.

State information of the buffer area BB of the buffer memory 130 may be managed while further including additional state information in addition to the above-described state information.

Figure 5:
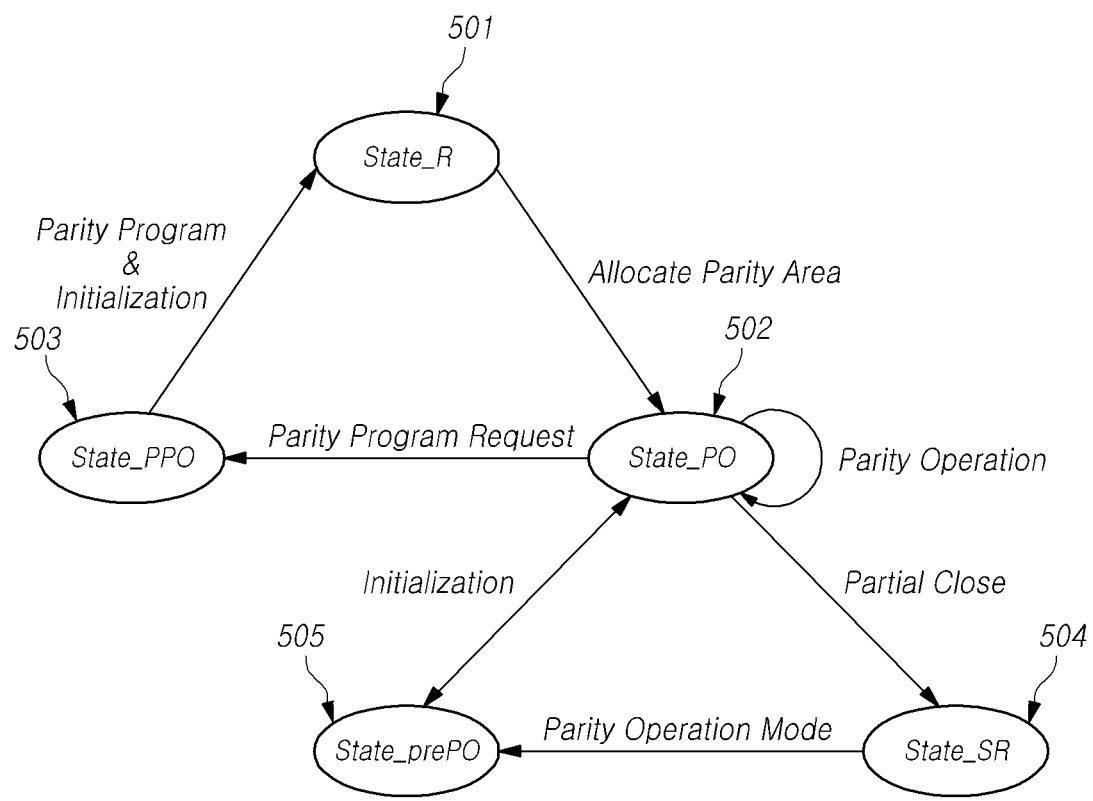
FIG. 5 is a diagram illustrating another example of states of a buffer memory, which is managed when a parity operation is performed in a storage device according to an embodiment of the disclosure.

FIG. 5 is a diagram illustrating another example of states of the buffer memory, which is managed when a parity operation is performed in a storage device according to an embodiment of the disclosure.

Referring to FIG. 5, a first processor 124a may divide and manage state information of the buffer area BB of the buffer memory 130 into a release state State_R indicated by the reference numeral 501, a parity operation state State_PO indicated by the reference numeral 502, a parity program state State_PPO indicated by the reference numeral 503, a sudden release state State_SR indicated by the reference numeral 504 and a pre-parity operation state State_prePO indicated by the reference numeral 505.

Overlapping descriptions made above with reference to FIG. 4 regarding the release state State_R, the parity operation state State_PO and the parity program state State_PPO are omitted below for convenience.

The sudden release state State_SR may mean state information of an area that is released from a parity area without a parity operation normally ending while the buffer area BB of the buffer memory 130 is used as a parity area.

For example, while data is written to the memory 110 and a parity operation is performed by a second processor 124b, writing of data may end without being normally completed.

The parity operation by the second processor 124b may be stopped without being normally completed. Because the parity operation is not completed in a normal manner, the buffer area BB used as a parity area may be in a state in which processes are not performed. For example, a process in which a parity value written to the buffer area BB is written to the memory 110, and a process in which the buffer area BB is initialized, are not performed.

The first processor 124a may set state information of the buffer area BB used as a parity area during a parity operation that has not normally ended, to the sudden release state State_SR, and may manage the sudden release state State_SR separately from the release state State_R.

When allocating the buffer area BB in the sudden release state State_SR as a new parity area, among the buffer areas BB of the buffer memory 130, the first processor 124a may transmit a parity operation mode signal by setting a flag indicating initialization of the corresponding buffer area BB. For example, the first processor 124a may transmit a flag indicating the pre-parity operation state State_prePO to the second processor 124b.

Upon receiving the flag indicating initialization from the first processor 124a, the second processor 124b may perform initialization of the buffer area BB allocated as a parity area, and then, may perform a parity operation.

After transmitting the flag indicating the pre-parity operation state State_prePO to the second processor 124b, the first processor 124a may set state information of the buffer area BB, set as a parity area, to the parity operation state State_PO.

The second processor 124b may perform the parity operation of generating and storing a parity value for data to be written to a predesignated area of the memory 110 until the parity operation is completed, and when the parity operation is completed, may transmit a parity program request signal to the first processor 124a.

In addition to an example in which a parity operation has not normally ended while the buffer area BB of the buffer memory 130 is used as a parity area, when initialization is necessary before the buffer area BB is used as a parity area, the first processor 124a may manage state information of the corresponding buffer area BB as the sudden release state State_SR.

For example, when the storage device 100 is booted, the first processor 124a may manage the buffer area BB of the buffer memory 130 as the sudden release state State_SR.

After booting, in a parity operation mode using the buffer area BB, the first processor 124a may transmit, to the second processor 124b, a flag indicating the pre-parity operation state State_prePO indicating that a parity operation be performed after the buffer area BB allocated as a parity area is initialized.

Upon receiving the flag indicating the pre-parity operation state State_prePO, the second processor 124b may perform the parity operation after initializing the corresponding buffer area BB.

When the parity operation using the buffer area BB allocated as a parity area has normally ended, and thus the operation of programming the parity value to the memory 110 is completed, the corresponding buffer area BB may be managed as the release state State_R after being initialized. Thereafter, when the corresponding buffer area BB is allocated as a parity area by the first processor 124a, the second processor 124b may perform a parity operation without separate initialization.

Since the first processor 124a manages the buffer area BB of the buffer memory 130 used in a parity operation separately as the release state State_R and the sudden release state State_SR, when the storage device 100 is booted or when a parity operation abnormally ends, the buffer area BB allocated as a parity area may be used after being initialized, whereby allocation of a parity area may be easily performed.

In addition, since the first processor 124a separately manages state information in a case where initialization is requested and in a case where initialization is not requested, initialization may be selectively performed when the buffer area BB is allocated. Efficiency of a parity operation by the second processor 124b may be improved.

In this way, according to embodiments of the disclosed technology, state information of the buffer area BB used as a parity area when a parity operation is performed by the second processor 124b may be managed by the first processor 124a, and the parity operation of the second processor 124b may be performed on the basis 1o of a control signal outputted by the first processor 124a according to the state information. Accordingly, efficiency of the parity operation performed using the limited buffer area BB of the buffer memory 130 may be improved.

Figure 6B:
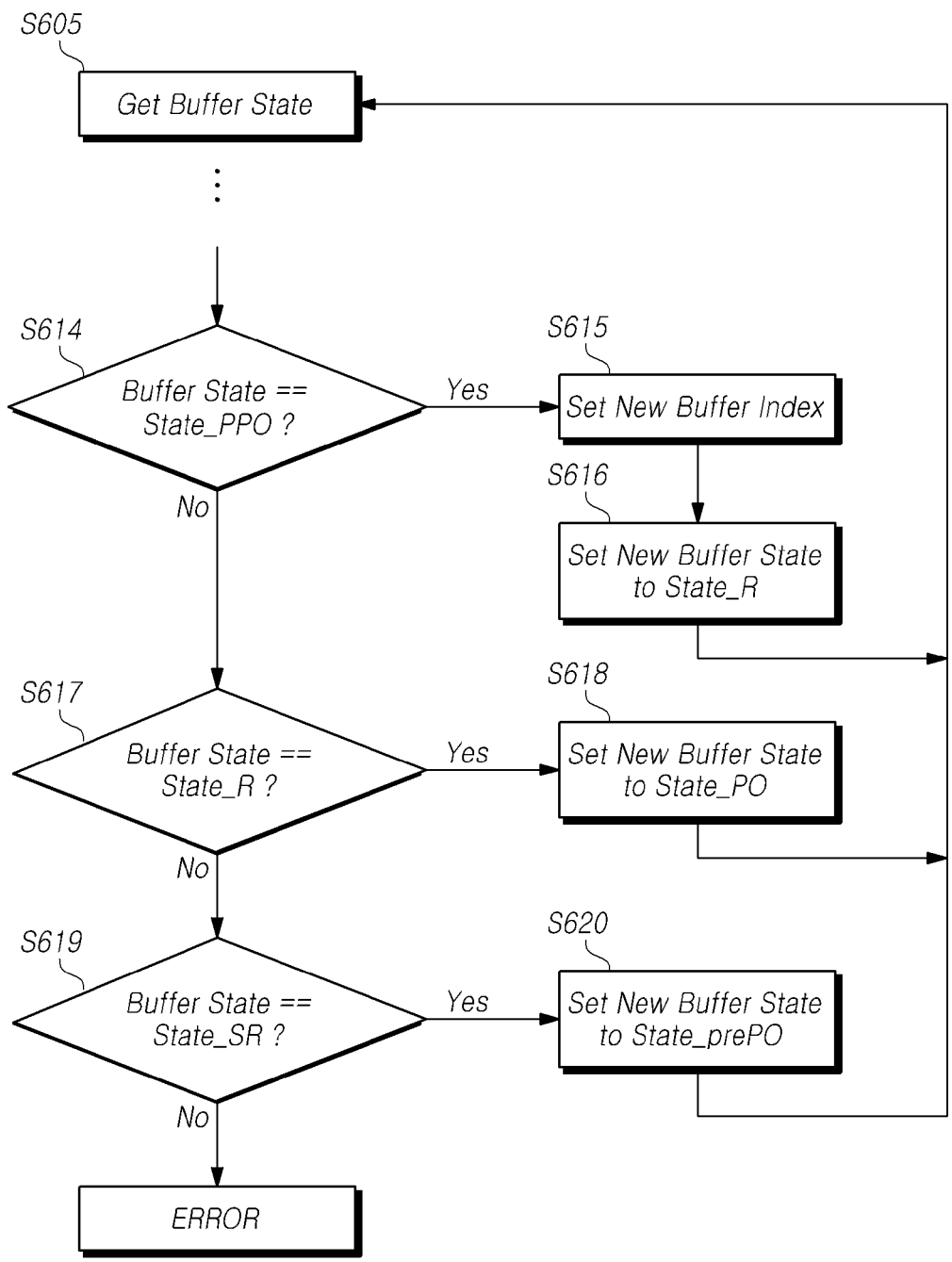

FIGS. 6A and 6B are flowcharts illustrating an example of a parity operation performed in a storage device according to an embodiment of the disclosure.

Referring to FIGS. 6A and 6B, a process of performing a parity operation by a controller 120 is shown, and a process of an operation performed by a first processor 124a is shown as an example.

For example, in FIG. 6A, the first processor 124a may start an operation for performing a parity operation on a first word line WL among an m number of word lines WL set as a unit area for the parity operation.

The first processor 124a may get state information of a buffer area BB in the buffer memory 130 (S601).

The first processor 124a may check whether the index of the buffer area BB to be allocated as a parity area is valid (S602).

When the index of the buffer area BB is invalid, the first processor 124a may allocate the index of the buffer area BB (S603), and may set state information of the buffer area BB to the pre-parity operation state State_prePO (S604). The first processor 124a may get state information of the buffer area BB again (S605), and when the index of the buffer area BB is valid, may immediately get state information of the buffer area BB.

The first processor 124a may check whether state information of the buffer area BB is the parity operation state State_PO (S606).

When state information of the buffer area BB is the parity operation state State_PO, the first processor 124a may check whether it is in a state in which parity program is needed (S607). The first processor 124a may check whether it is in a state in which a parity program is needed, for example, on the basis of the parity program request signal transmitted by the second processor 124b.

When it is in a state in which parity program is needed, the first processor 124a may set state information of the buffer area BB to the parity program state State_PPO (S608). The first processor 124a may transmit the parity program command signal instructing parity program to the second processor 124b (S609).

When parity program is completed by the second processor 124b, the first processor 124a may check whether programming of the m number of word lines WL is completed (S610).

When parity program for the m number of word lines WL is completed, the first processor 124a may end the parity operation on the corresponding area. When parity program for the m number of word lines WL is not completed, the first processor 124a may repeatedly perform the parity operation on a next word line WL.

When state information of the buffer area BB is not the parity operation state State_PO, the first processor 124a may check whether state information of the buffer area BB is the pre-parity operation state State_prePO (S611).

When state information of the buffer area BB is the pre-parity operation state State_prePO, the first processor 124a may set a flag indicating the pre-parity operation state State_prePO, and thereby, may notify the second processor 124b that initialization of the buffer area BB is required (S612).

The first processor 124a may set state information of the corresponding buffer area BB to the parity operation state State_PO (S613), and the second processor 124b may initialize the buffer area BB and then perform the parity operation.

When state information of the buffer area BB is not the pre-parity operation state State_prePO, the first processor 124a may check whether state information of the buffer area BB is the parity program state State_PPO (S614).

Referring to FIG. 6B, when state information of the buffer area BB is the parity program state State_PPO, the first processor 124a may set the index of a new buffer area BB (S615), and may set state information of the buffer area BB to the release state State_R (S616).

Since the buffer area BB is in a state in which it is used in a process in which a parity program operation is performed, the first processor 124a may proceed with a process for performing a parity operation by allocating the new buffer area BB. Also, the first processor 124a may set state information of the buffer area BB for which parity program is performed, to the release state State_R so that initialization is performed after the parity program is completed.

When state information of the buffer area BB is not the parity program state State_PPO, the first processor 124a may check whether state information of the buffer area BB is the release state State_R (S617).

When state information of the buffer area BB is the release state State_R, since the corresponding buffer area BB is in an initialized state, the first processor 124a may set state information of the buffer area BB to the parity operation state State_PO (S618). The corresponding buffer area BB may be used for the parity operation.

When state information of the buffer area BB is not the release state State_R, the first processor 124a may check whether state information of the buffer area BB is the sudden release state State_SR (S619).

When state information of the buffer area BB is the sudden release state State_SR, the first processor 124a may set state information of the buffer area BB to the pre-parity operation state State_prePO (S620). After initialization of the buffer area BB, a parity operation may be performed.

When state information of the buffer area BB is not the sudden release state State_SR, the first processor 124a may output an error.

The above examples illustrate implementation of methods of managing state information of the buffer area BB of the buffer memory 130 by the first processor 124a, however, methods of managing state information of the buffer area BB in a parity operation mode may be implemented in various ways.

As such, since state information of the buffer area BB is managed by the first processor 124a and a parity operation is performed by the second processor 124b, it is possible to reduce the delay of the parity operation that is caused by the fact that the second processor 124b does not check state information of the buffer area BB.

In addition, since initialization of the buffer area BB is selectively performed according to the control signal of the first processor 124a, efficiency of the parity operation by the second processor 124b may be improved.

As efficiency of the parity operation is improved by the first processor 124a and the second processor 124b, the parity operation may be performed using the limited buffer area BB of the buffer memory 130, and performance of the parity operation may be improved.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
a main memory including a plurality of memory areas; and
a controller configured to control the main memory,
the controller comprising:
a buffer memory;
a first processor configured to, in a parity operation mode in which a parity value for data to be written to the main memory is generated, manage state information of at least one of a plurality of buffer areas included in the buffer memory, and to output a control signal according to the state information; and
a second processor configured to operate according to the control signal of the first processor, and to write the parity value to the buffer memory,
wherein, while a parity operation is performed by the second processor, the first processor manages the state information of the plurality of buffer areas used for the parity operation.

2. The storage device according to claim 1, wherein, in the parity operation mode, the first processor allocates at least one of the plurality of buffer areas as a parity area, and sets the state information of the buffer area allocated as the parity area to a parity operation state.

3. The storage device according to claim 2, wherein the second processor generates the parity value for the data to be written to a predesignated memory area among the plurality of memory areas, and writes the parity value to the buffer area allocated as the parity area.

4. The storage device according to claim 3, wherein, when generation of the parity value for the data to be written to the predesignated memory area is completed, the second processor transmits a parity program request signal to the first processor.

5. The storage device according to claim 4, wherein, when the parity program request signal is received, the first processor sets the state information of the buffer area allocated as the parity area to a parity program state, and transmits a parity program command signal to the second processor.

6. The storage device according to claim 5, wherein, when the parity program command signal is received, the second processor writes the parity value written to the buffer area allocated as the parity area to the main memory, and initializes the buffer area allocated as the parity area.

7. The storage device according to claim 5, wherein, when transmitting the parity program command signal to the second processor, the first processor sets the state information of the buffer area allocated as the parity area to a release state.

8. The storage device according to claim 2, wherein the second processor writes the parity value to the buffer area allocated as the parity area without initializing the buffer area allocated as the parity area.

9. The storage device according to claim 2, wherein, when a process in which the data is written to the main memory is ended normally, the first processor sets the state information of the buffer area allocated as the parity area to a release state, and when the process in which the data is written to the main memory does not normally end, the first processor sets the state information of the buffer area allocated as the parity area to a sudden release state.

10. The storage device according to claim 9, wherein, when the buffer area set to the sudden release state is allocated as a new parity area, the first processor sets the state information of the buffer area to a pre-parity operation state, and transmits a flag indicating the pre-parity operation state to the second processor.

11. The storage device according to claim 10, wherein, when the flag indicating the pre-parity operation state is received, the second processor initializes the buffer area set to the pre-parity operation state and writes the parity value to the buffer area.

12. The storage device according to claim 10, wherein, when transmitting the flag indicating the pre-parity operation state to the second processor, the first processor sets the state information of the buffer area set to the pre-parity operation state to the parity operation state.

13. The storage device according to claim 1, wherein, upon booting, the first processor sets the state information of the plurality of buffer areas included in the buffer memory to a sudden release state.

14. A controller comprising:

a buffer memory;

a first processor configured to, in a parity operation mode in which a parity value for data to be written to a memory located outside the controller is generated, manage state information of at least one of a plurality of buffer areas included in the buffer memory, and to output a control signal according to the state information; and a second processor configured to operate according to the control signal of the first processor, and to write the parity value to the buffer memory, wherein, while a parity operation is performed by the second processor, the first processor manages the state information of the plurality of buffer areas used for the parity operation.

15. The controller according to claim 14, wherein the second processor writes the parity value written to the buffer memory to the memory located outside the controller according to a command of the first processor.

16. The controller according to claim 15, wherein writing of the parity value to the memory located outside the controller is completed, the second processor initializes a buffer area to which the parity value is written in the buffer memory.

17. The controller according to claim 14, wherein the first processor sets the state information of a buffer area to which the parity value is not written by the second processor among the plurality of buffer areas, to a release state in which initialization is not required or a sudden release state in which initialization is required.

18. A method for operating a controller, comprising:

allocating, by a first processor, at least one among a plurality of buffer areas included in a buffer memory, as a parity area;

generating, by a second processor, a parity value for data to be written to a predesignated memory area of a memory located outside the controller, and writing the parity value to the parity area;

when writing of the parity value for the data to be written to the predesignated memory area is completed, writing, by the second processor, the parity value to the memory located outside the controller; and initializing, by the first processor, the parity area to which the parity value is written, wherein, while a parity operation is performed by the second processor, the first processor manages state information of the plurality of buffer areas used for the parity operation.

19. The method according to claim 18, further comprising:

when a process in which the data is written to the main memory is ended normally, the first processor sets the state information of the buffer area allocated as the parity area to a release state, and when writing of the data to the predesignated memory area does not end normally, stopping generation of the parity value and managing the state information of the buffer area allocated as the parity area as a sudden release state.

20. The method according to claim 19, further comprising:

when the buffer area set to the sudden release state is allocated as a new parity area, outputting a flag indicating initialization of the new parity area.

* * * * *